US012322850B2

(12) United States Patent
Baur et al.

(10) Patent No.: US 12,322,850 B2
(45) Date of Patent: Jun. 3, 2025

(54) HIGH FREQUENCY ADAPTER FOR CONNECTING A HIGH FREQUENCY ANTENNA WITH AN ANTENNA CONNECTOR

(71) Applicant: VEGA GRIESHABER KG, Wolfach (DE)

(72) Inventors: Roland Baur, Koenigsfeld (DE); Klaus Kienzle, Zell am Harmersbach (DE); Fritz Lenk, Schiltach (DE); Johannes Falk, St. Georgen (DE)

(73) Assignee: VEGA GRIESHABER KG, Wolfach (DE)

( * ) Notice: Subject to any disclaimer, the term of this patent is extended or adjusted under 35 U.S.C. 154(b) by 273 days.

(21) Appl. No.: 17/988,318

(22) Filed: Nov. 16, 2022

(65) Prior Publication Data

US 2023/0155278 A1 May 18, 2023

(30) Foreign Application Priority Data

Nov. 16, 2021 (EP) .................................... 21208497

(51) Int. Cl.
*H01P 5/10* (2006.01)
*H01P 5/103* (2006.01)

(52) U.S. Cl.
CPC .................................. *H01P 5/103* (2013.01)

(58) Field of Classification Search
CPC .. H01P 5/103; H01P 3/12; H01P 5/082; H01P 5/08; H01P 3/06; Y02D 30/70
See application file for complete search history.

(56) References Cited

U.S. PATENT DOCUMENTS

2015/0029065 A1* 1/2015 Cheng .................... H01Q 19/06 343/753
2019/0312327 A1* 10/2019 Kitt .......................... H01P 3/06
2022/0037756 A1* 2/2022 Skowyra ................ H01P 5/103

FOREIGN PATENT DOCUMENTS

| | | | |
|---|---|---|---|
| CN | 103268971 | A | 8/2013 |
| CN | 110739513 | A | 1/2020 |
| DE | 31 27 693 | A1 | 5/1983 |
| JP | 2-128503 | A | 5/1990 |

OTHER PUBLICATIONS

Extended European Search Report issued May 23, 2022 in European Patent Application No. 21208497.4 (with English Translation of Category of Cited Documents), 10 pages.
Office Action issued Apr. 3, 2023, in corresponding Germany Patent Application No. 21 208 497.4, 10 pages.

* cited by examiner

*Primary Examiner* — Quan Tra
(74) *Attorney, Agent, or Firm* — Oblon, McClelland, Maier & Neustadt, L.L.P.

(57) ABSTRACT

A high frequency adapter for connecting a high frequency antenna to an antenna connector. The high frequency adapter comprises a waveguide adapted to transmit high frequency waves to and from the high frequency antenna. Further, it comprises an impedance matching element disposed within the waveguide. Further, the high frequency adapter comprises a conductive inner conductor electrically and mechanically connected to the impedance matching element and a conductive sheath connecting to the waveguide. In addition, the high frequency adapter includes an electrically insulative spacer element disposed between the sheath and the inner conductor, thereby insulating the inner conductor from the sheath and fluidically sealing the waveguide.

16 Claims, 3 Drawing Sheets

HIGH FREQUENCY ADAPTER FOR CONNECTING A HIGH FREQUENCY ANTENNA WITH AN ANTENNA CONNECTOR

CROSS-REFERENCE TO RELATED APPLICATIONS

This application claims the benefit of the filing date of European Patent Application No. 21 208 497.4 filed on 16 Nov. 2021, the entire content of which is incorporated herein by reference.

FIELD

The disclosure relates to a high frequency adapter for connecting a high frequency antenna to an antenna connector. Furthermore, the disclosure relates to a use of the high frequency adapter.

BACKGROUND

In high-frequency technology, in particular in radar technology, electromagnetic energy, e.g., from a high-frequency generator, is directed to a high-frequency antenna, e.g., to a horn antenna, in order to be able to transmit and/or receive high-frequency waves. This may be implemented by means of a high frequency adapter. In at least some cases, the high frequency waves are conducted from the antenna to the adapter via a waveguide. For example, along this path, moisture can enter the high frequency adapter and cause the adapter to malfunction, e.g., short circuit conductive parts.

SUMMARY

There may be a desire to reduce moisture penetration into parts of a high-frequency adapter that are susceptible to failure. This desire is met by the subject-matter of the independent patent claims. Further embodiments result from the subclaims and the following description.

One aspect relates to a high frequency adapter (for short: adapter) for connecting a high frequency antenna to an antenna connector. The high frequency adapter comprises:

CGS:THU a waveguide (for example a hollow cylindrical waveguide), which is arranged for a transmission of high-frequency waves from and to the high-frequency antenna;

an impedance matching element disposed within the waveguide and adapted to impedance match the high frequency antenna;

a conductive inner conductor electrically and mechanically connected to the impedance matching element, the inner conductor being electrically connected directly or indirectly to the antenna connector;

a conductive (for example hollow-cylindrical) sheath adjoining the waveguide; and an electrically insulating hollow cylindrical spacer element disposed between the sheath and the inner conductor, thereby insulating the inner conductor from the sheath and sealing the waveguide in a fluid-tight manner.

For instance, the high frequency adapter may be set up for the retransmission of high frequency waves in a range of radar waves. At least some specifics of the adapter can be set up, for example, for a part of the radar frequency range, e.g., for the so-called K-band, which extends over a frequency range from 18 to 27 GHz. At least some of these specifics may also be adaptable—e.g., by minor modifications—to other frequency ranges of the radar frequency range. The adapter may be connected at one side to, for example, a horn antenna and/or other high frequency antenna. The adapter can be connected on another side, for example, to an antenna connector in the form of a coaxial connector. The transmission or forwarding of the high-frequency waves to the antenna can be performed by way of a waveguide, which can have a hollow cylindrical shape. In this case, the antenna may be located in an environment that may, in at least some cases, have moisture.

In at least some cases, the high frequency waves are conducted from the antenna to the adapter via a waveguide. In this case, for at least some frequency ranges, an impedance matching element may be arranged within the waveguide that is arranged to impedance match the high frequency antenna. In this case, the impedances at the two ends of the adapter can differ from each other: In the coaxial section, for example, the impedance may be in the range of about 50-75 ohms, and in the waveguide section, for example, the impedance may be in the range of about 700 ohms. For lower frequency radar bands, e.g., for the K-band, the impedance matching element can be designed, for example, in a stepped shape and significantly narrower than an inner through meter of the waveguide. The impedance matching element so designed is sometimes referred to as a fin. The impedance matching element may have a different shape for other frequency ranges. The impedance matching element can have electrical contact with the outer conductor of the coaxial system at at least one point in the area of the transition between the coaxial and the waveguide system as well as at the base surface of the fin in order to realize the matching and/or radiation.

The impedance matching element is electrically and mechanically connected to a conductive inner conductor. The inner conductor can be electrically connected directly or indirectly to the antenna connector. In the case of a direct connection, the inner conductor can be routed to the end of the adapter opposite the antenna connector, so that in this case the antenna connector can be plugged onto this end of the inner conductor. In the case of an indirect connection, at least one other conductive component may be arranged on the inner conductor. The inner conductor may extend along a central axis of the waveguide.

The high frequency adapter further comprises a conductive hollow cylindrical sheath that connects to the waveguide. The sheath may connect to the waveguide without gaps and/or tightly. The sheath may comprise a different material than the waveguide; for example, the sheath may comprise or consist of stainless steel, and the waveguide may comprise or consist of copper. Both the waveguide and the cladding may advantageously be conductive to provide electrical shielding and/or contribute to a defined impedance of the adapter. The sheath may be arranged parallel to the center axis of the waveguide.

The high frequency adapter further comprises an electrically insulating hollow cylindrical spacer element disposed between the sheath and the inner conductor, thereby insulating the inner conductor from the sheath and sealing the waveguide in a fluid-tight manner.

In one variation, the waveguide and/or the cladding may have a rectangular shape, particularly a square shape. The rectangular shape may involve the outer contour and/or the inner walls. The inner and/or outer corners may be rounded.

With this design, in particular due to the spacer element, the high-frequency adapter not only has a defined impedance in the area of the coaxial system, but is also robust against moisture that diffuses in and then condenses, because the spacer element can reduce or even prevent moisture from penetrating into parts of a high frequency adapter that are susceptible to interference, and in particular can prevent a short circuit between the sheath and the inner conductor. A possible condensation point can thus be shifted to an area less sensitive to high-frequency waves. In addition, the spacer element can simplify the assembly of the high-frequency adapter, e.g., serve as an insertion aid during assembly and thus contribute to preventing incorrect assembly. Furthermore, the adapter has proven to be particularly robust in experiments, especially with regard to vibrations, and has an increased longevity, e.g., due to the additional support of the inner conductor of the coaxial system.

In some embodiments, a first inner diameter of the cladding is smaller than a second inner diameter of the waveguide such that a step is formed in the region of the connection between the waveguide and the cladding. In addition, the spacer element is at least partially disposed within the waveguide and forms a collar within the waveguide. This can contribute both to a better mechanical cohesion of the adapter and to a better tightness against diffused moisture. In addition, this collar can prevent condensate from accumulating in the cavity.

In some embodiments, the spacer element has or consists of materials such as polytetrafluoroethylene, PTFE, polyetheretherketone, PEEK, polyethylene, PE, or polyvinylidene fluoride, PVDF, which are suitable for RF applications. These materials not only have dielectric properties, but also a certain toughness and elasticity, so that the spacer element fits particularly tightly between the adjacent components of the adapter and in this way fills the technically necessary gap between the fin and the coaxial feed. The hole for the inner conductor additionally provides a guide for assembly in manufacturing, to which the relatively low friction—also during assembly—may also contribute. In addition, at least some of the usable materials may be temperature resistant and/or hydrophobic.

In an embodiment, the spacer element may be implemented as a plastic turned part. PTFE, for example, can be used as the plastic. This type of production allows the spacer element to be manufactured with particular precision.

In some embodiments, the high frequency adapter further comprises a process separation disposed within the sheath and having a conductive element passing therethrough that is electrically connected to the inner conductor. The process separation may be configured, for example, as a glass feedthrough. It should be noted that—due to the spacer element—moisture can also no longer condense on the process separation, in particular because the spacer element realizes a seal against the waveguide and other parts of the adapter.

In an embodiment, the conductive element is made in one piece with the inner conductor. This can contribute to a particularly simple manufacturing process. This embodiment can be—realized with or without process separation.

In an embodiment, the conductive element has a similar coefficient of expansion as the process separation. Advantageously, this means that the conductive element remains robust and arranged in the process separation over the long term, even in the event of large fluctuations in temperature.

In some embodiments, the process separation comprises glass and/or ceramic, and/or the conductive element comprises a nickel alloy, or these elements may comprise these materials.

In an embodiment, the conductive element is designed for direct connection to the antenna connector. The conductive element can be particularly robust and/or have a particularly conductive and/or corrosion-resistant coating, such as gold, at the connection points.

One aspect relates to a method of manufacturing a high frequency adapter, comprising the steps of:

arranging an electrically insulating hollow cylindrical spacer element in a conductive hollow cylindrical jacket; and inserting a conductive inner conductor into the spacer element; and connecting a waveguide with an impedance matching element arranged inside the waveguide, for example by pressing it into an existing hole in the impedance matching element.

The spacer element can particularly advantageously serve as an insertion aid during assembly, thereby helping to prevent incorrect assembly.

In some embodiments, the method comprises the further step of:

arranging a process separation in the sheath, through which process separation a conductive element is led, which is arranged for an electrical connection with the inner conductor.

One aspect relates to a use of a high frequency adapter as described above and/or below for connecting a high frequency antenna to an antenna connector. The high-frequency adapter can be particularly suitable in particular for level measurement, for topology determination and/or for level limit determination, because it can be used, for example, to realize a feedthrough between an antenna in a container and a high-frequency generator outside the container. Due to the robust design of the high-frequency adapter, the container can also be, for example, a process tank, which is designed in particular for high temperatures and/or pressures. Furthermore, embodiments with a process separation can further increase the robustness of the high-frequency adapter.

For further clarification, the disclosure is described with reference to embodiments illustrated in the figures. These embodiments are to be understood only as examples and not as limitations.

DETAILED DESCRIPTION OF EMBODIMENTS

Figure 1:
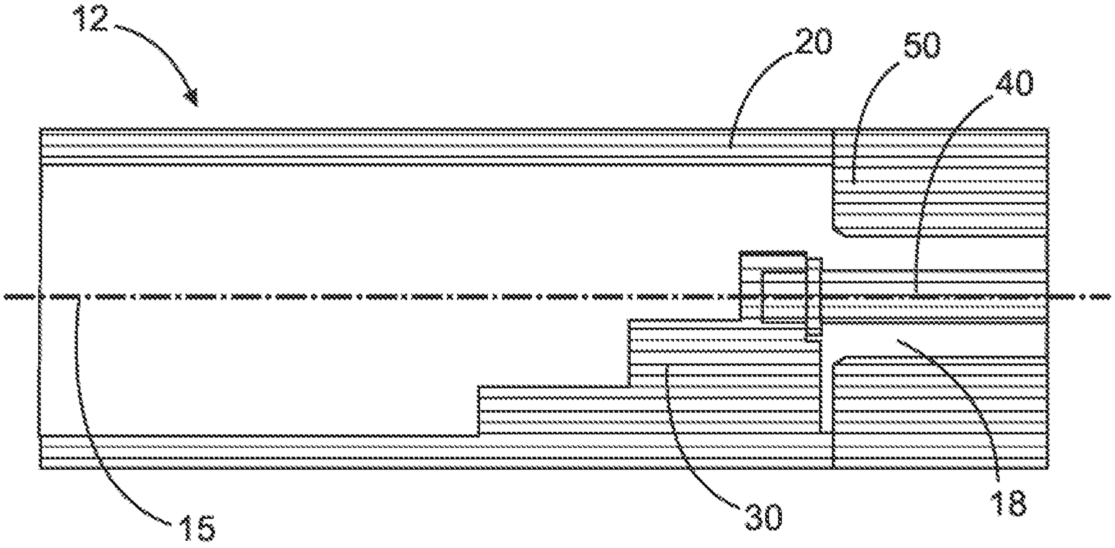
FIG. 1 shows a high frequency adapter in a longitudinal section.

FIG. 1 schematically shows a high frequency adapter 12 in longitudinal section. The high-frequency adapter 12 has a hollow cylindrical waveguide 20, which is set up to transmit high-frequency waves from and to a high-frequency antenna 80 (not shown). Adjacent to the waveguide 20 is a conductive jacket 50. At least partially disposed within the sheath 50 is a conductive inner conductor 40 that is electrically and mechanically connected to an impedance matching element 30. The inner conductor 40 is separated from the sheath 50 by a cavity 18. The cavity 18 may be shaped as a rotationally symmetrical cavity, e.g., in the case of a round high frequency adapter; in the case of other shapes of high frequency adapter—e.g., rectangular, hexagonal, etc.—correspondingly adapted or likewise cylindrical. In at least some cases, moisture may enter the cavity 18. This can significantly degrade the functionality of the high frequency adapter, up to and including failure of the adapter.

Figure 2:
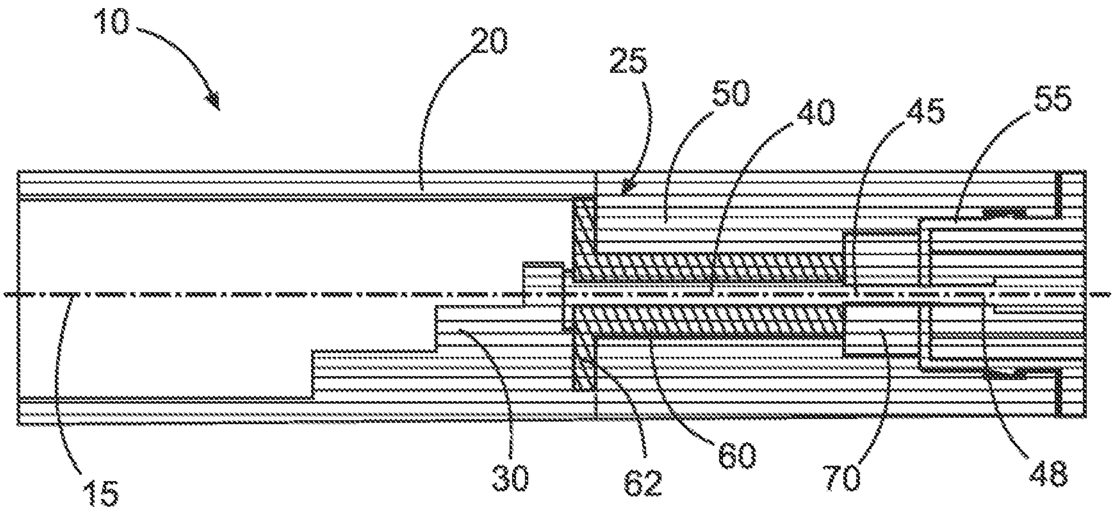
FIG. 2 shows a high-frequency adapter according to an embodiment in a longitudinal section.

FIG. 2 schematically shows a high frequency adapter 10 according to an embodiment in a longitudinal section. The high-frequency adapter 10 is arranged for connecting a high-frequency antenna 80 (left side, not shown) to an antenna connector 90 (right side, not shown). The high-frequency adapter 10 has a hollow cylindrical waveguide 20, which is arranged to transmit high-frequency waves from and to the high frequency antenna 80—which is arranged on the left side of the waveguide 20. Within the waveguide 20, a step-shaped impedance matching element 30 is arranged, which is arranged for impedance matching to the high frequency antenna 80. The high frequency adapter 10 further comprises a conductive inner conductor 40 electrically and mechanically connected to the impedance matching element 30, wherein the inner conductor 40 is electrically indirectly connected—namely via a conductive element 45—to the antenna connector 90. A conductive hollow-cylindrical sheath 50 adjoins the waveguide 20. The joint between the waveguide 20 and the cladding 50 may be sealed, but in at least some cases may also allow moisture intrusion due to defects and/or long-term stresses. In at least some embodiments, the joint may be omitted. The high frequency adapter 10 further comprises an electrically insulative hollow cylindrical spacer element 60 disposed between the cladding 50 and the inner conductor 40, thereby isolating the inner conductor 40 from the cladding 50 and providing a fluid-tight seal to the waveguide 20. In at least some embodiments, the spacer element 60 may be configured to be non-fluid-tight. The spacer element 60 may be configured to "occupy" the space where condensate could form, and in this way may displace the condensate or reduce or prevent the formation of condensate. Advantageously, this can also prevent malfunction of the high-frequency adapter 10 in the event that moisture enters. The high-frequency adapter 10 further comprises a process separation 70 to further increase the robustness of the high-frequency adapter. The conductive element 45 is passed through the process separation 70.

On one side thereof, the conductive element 45 is electrically connected to the inner conductor 40. On the other side, the conductive element 45 is arranged for connection to an antenna connector 90 (right side), via the end protruding on the right side from the process separation 70 and from a sheath 55.

Figure 3:
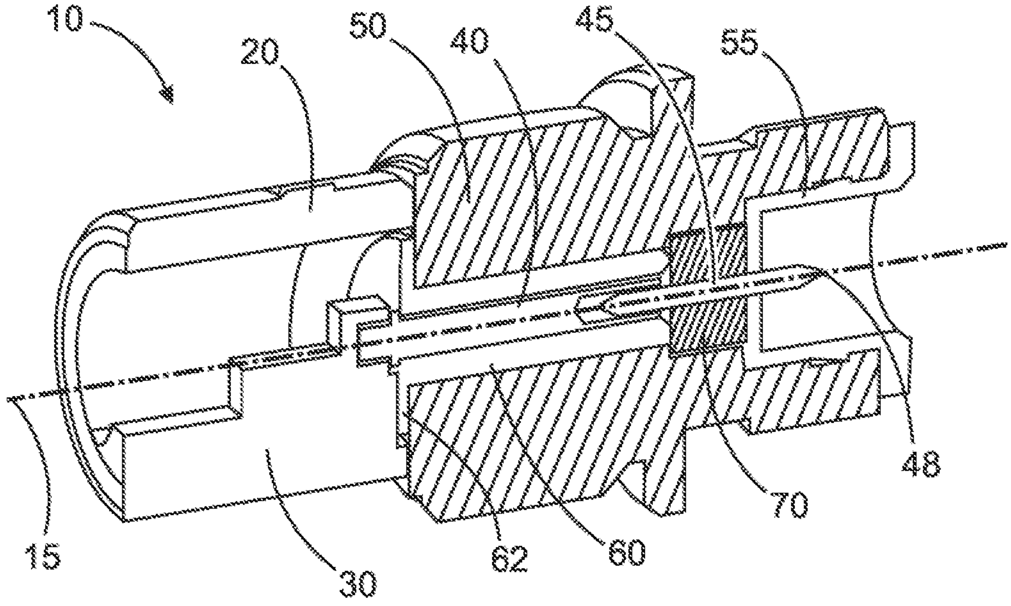
FIG. 3 shows a high-frequency adapter according to an embodiment in a further longitudinal section.

FIG. 3 schematically shows a high-frequency adapter 10 according to an embodiment in a further longitudinal section. Here, the same reference signs as in FIG. 2 denote the same or similar elements. Here, FIG. 3 shows particularly clearly how the spacer element 60 insulates the inner conductor 40 from the sheath 50 and in particular with the cooperation of a collar 62—also realizes a seal against the wall 50. In this embodiment example, the conductive element 45 is realized with pointed ends to further simplify assembly.

Figure 4:
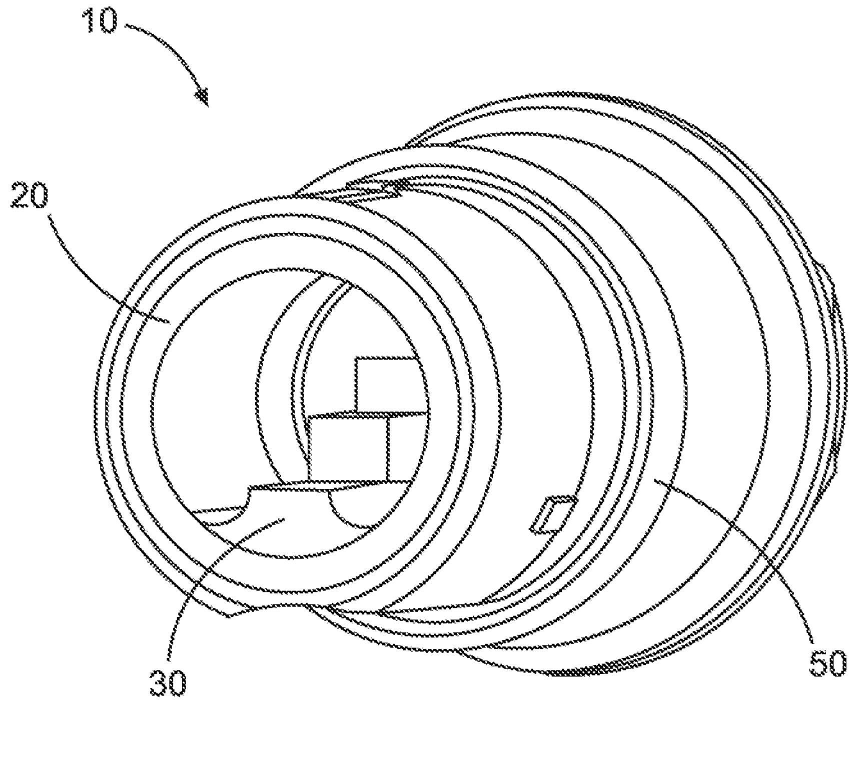
FIG. 4 shows a high-frequency adapter according to an embodiment in a perspective external view.

FIG. 4 schematically shows a high-frequency adapter 10 according to an embodiment in a perspective external view. Here, the same reference signs as in FIG. 2 denote the same or similar elements. In particular, the design of the impedance matching element 30 becomes clear, which in this embodiment is designed to be step-shaped and significantly narrower than an inner diameter of the waveguide. The impedance matching element 30 designed in this manner is sometimes referred to as a fin. This design may be particularly suitable for lower frequency radar bands, such as the K-band. For other frequency bands, the impedance matching element—and/or other components of the high-frequency adapter 10—may be designed at least slightly differently.

Figure 5:
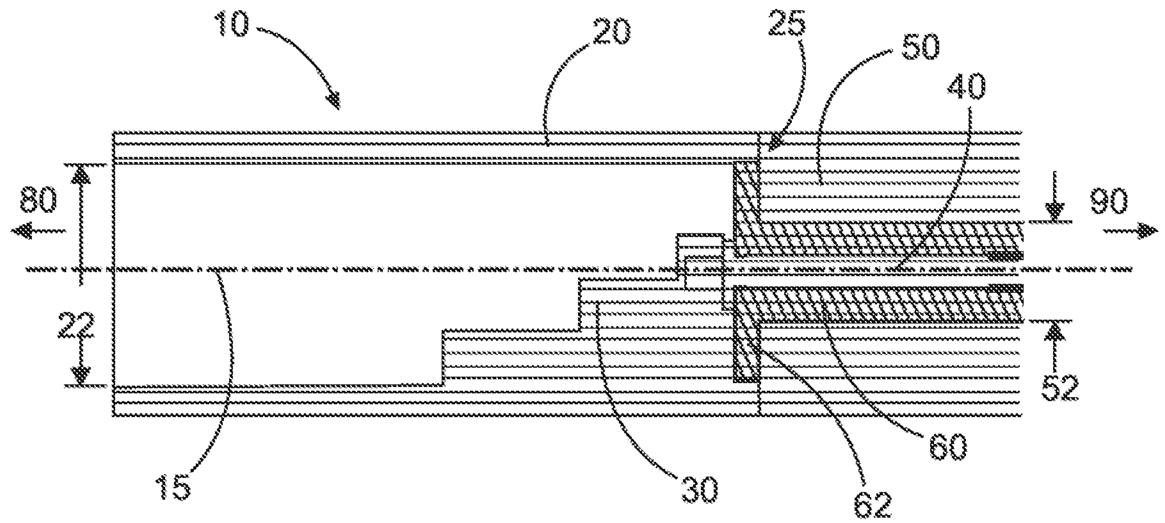
FIG. 5 shows a high-frequency adapter according to a further embodiment in a longitudinal section.

FIG. 5 schematically shows a high-frequency adapter 10 according to a further embodiment in a longitudinal section. The same reference signs as in FIG. 2 denote the same or similar elements. This embodiment does not have a process separation 70. Further, the conductive element 45 is integrally formed with the inner conductor (40) so that an antenna connector 90 (right, not shown) is electrically connected directly to the antenna connector 90. Furthermore, it is clear that a first inner diameter 52 of the sheath 50 (as also shown, for example, in FIG. 2) is smaller than a second inner diameter 22 of the waveguide 20, so that a step 25 is formed in the region of the connection between the waveguide and the sheath.

Figure 6:
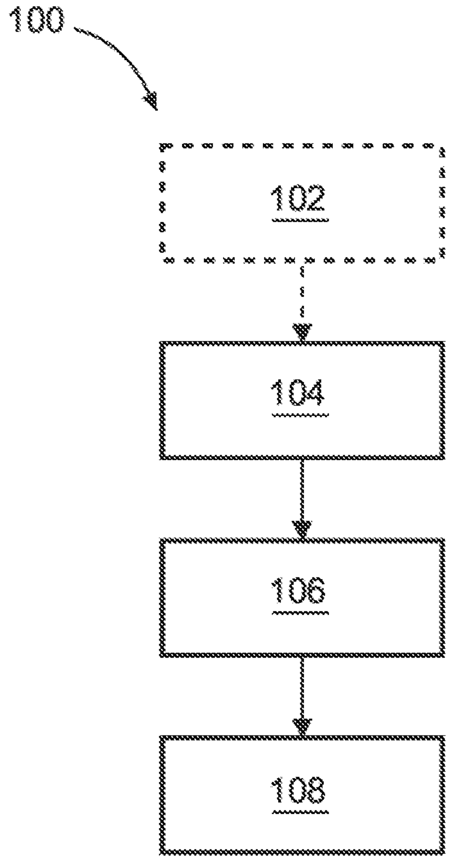
FIG. 6 shows a flowchart according of a method according to an embodiment.

FIG. 6 shows a flowchart 100 showing a manufacturing process for a high frequency adapter 10 (see, e.g., FIG. 2 to FIG. 5) according to an embodiment form. In an optional step 102, a process separation 70 is disposed in the shell 50, wherein a conductive element 45 is passed through the process separation 70 and is adapted for electrical connection to the inner conductor 40. In a step 104, an electrically insulating spacer element 60 is disposed in conductive sheath 50. In a step 106, a conductive inner conductor 40 is inserted into the spacer element 60. In a step 108, a waveguide 20 is connected, with an impedance matching element 30 disposed within the waveguide 20.

List of Reference Signs

10 High frequency adapter
12 High frequency adapter
15 Center axis
18 Cavity
20 Waveguide
22 Internal diameter of the waveguide
25 Step
30 Impedance matching element
40 Inner conductor
45 Conductive element
50 Sheath
52 Inner diameter of the sheath
55 Sheath
60 Spacer element
62 Collar of the spacer element
70 Process separation
80 Antenna
90 Antenna connector
100 Flow diagram
102-108 steps

The invention claimed is:

1. A high frequency adapter configured to connect a high frequency antenna to an antenna connector, the high frequency adapter comprising:

a waveguide configured to relay high frequency waves to and from the high frequency antenna;

an impedance matching element disposed within the waveguide and configured to impedance match the high frequency antenna;

a conductive inner conductor electrically and mechanically connected to the impedance matching element, the inner conductor being electrically connectable directly or indirectly to the antenna connector;

a conductive sheath connecting to the waveguide; and an electrically insulating spacer element disposed between the conductive sheath and the inner conductor, thereby insulating the inner conductor from the conductive sheath and sealing the waveguide in a fluid-tight manner, wherein a first inner diameter of the conductive sheath is smaller than a second inner diameter of the waveguide so that a step is formed in a region of the connection between the waveguide and the conductive sheath, and wherein the spacer element is at least partially disposed within the waveguide and forms a collar within the waveguide.

2. The high frequency adapter according to claim 1, wherein the spacer element comprises polytetrafluoroethylene, PTFE, polyetheretherketone, PEEK, polyethylene, PE, or polyvinylidene fluoride, PVDF.

3. The high frequency adapter according to claim 1, further comprising:

a process separator disposed within the conductive sheath and having a conductive element passing therethrough, the conductive element being electrically connected to the inner conductor.

4. The high frequency adapter according to claim 3, wherein the conductive element is integrally formed with the inner conductor.

5. The high frequency adapter according to claim 3, wherein the conductive element has a similar coefficient of expansion as the process separation.

6. The high frequency adapter according to claim 3, wherein the process separation comprises glass and/or ceramic, and/or the conductive element comprises a nickel alloy.

7. The high frequency adapter according to claim 3, wherein the conductive element is configured for direct connection to the antenna connector.

8. A method of manufacturing a high frequency adapter, comprising:

disposing an electrically insulating hollow cylindrical spacer element within a conductive hollow cylindrical sheath;

inserting a conductive inner conductor into the spacer element; and connecting a waveguide with an impedance matching element arranged within the waveguide, wherein a first inner diameter of the conductive sheath is smaller than a second inner diameter of the waveguide so that a step is formed in a region of the connection between the waveguide and the conductive sheath, and wherein the spacer element is at least partially disposed within the waveguide and forms a collar within the waveguide.

9. The method of claim 8, comprising:

arranging a process separator in the conductive hollow cylindrical sheath, through which process separator a conductive element is led, which is configured for an electrical connection with the inner conductor.

10. The high frequency adapter according to claim 1, wherein the spacer element consists of polytetrafluoroethylene, PTFE, polyetheretherketone, PEEK, polyethylene, PE, or polyvinylidene fluoride, PVDF.

11. The high frequency adapter according to claim 3, wherein the process separation consists of glass and/or ceramic, and/or the conductive element consists of a nickel alloy.

12. The high frequency adapter according to claim 4, wherein the process separation consists of glass and/or ceramic, and/or the conductive element consists of a nickel alloy.

13. The high frequency adapter according to claim 5, wherein the process separation consists of glass and/or ceramic, and/or the conductive element consists of a nickel alloy.

14. The high frequency adapter according to claim 3, wherein the process separation comprises glass and/or ceramic, and/or the conductive element comprises a nickel alloy.

15. The high frequency adapter according to claim 4, wherein the process separation comprises glass and/or ceramic, and/or the conductive element comprises a nickel alloy.

16. The high frequency adapter according to claim 2, further comprising:

a process separator disposed within the conductive sheath and having a conductive element passing therethrough, the conductive element being electrically connected to the inner conductor.

* * * * *